(12) United States Patent
Saunin et al.

(10) Patent No.: US 9,568,495 B2
(45) Date of Patent: Feb. 14, 2017

(54) SYSTEMS AND METHODS FOR NON-DESTRUCTIVE SURFACE CHEMICAL ANALYSIS OF SAMPLES

(71) Applicant: AIST-NT, Inc., Novato, CA (US)

(72) Inventors: Sergey A. Saunin, Novato, CA (US); Andrey V. Krayev, Novato, CA (US); Vladimir V. Zhishimontov, Santa Rosa, CA (US); Vasily V. Gavrilyuk, Moscow (RU); Leonid N. Grigorov, Novato, CA (US); Alexey V. Belyaev, Moscow (RU); Dmitry A. Evplov, Moscow (RU)

(73) Assignee: AIST-NT, Inc., Novato, CA (US)

( * ) Notice: Subject to any disclaimer, the term of this patent is extended or adjusted under 35 U.S.C. 154(b) by 0 days.

(21) Appl. No.: 14/717,336

(22) Filed: May 20, 2015

(65) Prior Publication Data

US 2016/0341764 A1    Nov. 24, 2016

(51) Int. Cl.
*G01Q 10/00* (2010.01)
*G01Q 30/02* (2010.01)

(52) U.S. Cl.
CPC ............ *G01Q 30/025* (2013.01); *G01Q 10/00* (2013.01)

(58) Field of Classification Search
CPC ........ G01Q 10/00; G01Q 10/02; G01Q 10/04; G01Q 20/00; G01Q 20/02; G01Q 30/00; G01Q 30/02; G01Q 30/025; G01Q 60/00; G01Q 60/02; G01Q 60/34
USPC ............ 850/1, 2, 3, 6, 8, 22, 33, 35, 38, 52
See application file for complete search history.

(56) References Cited

U.S. PATENT DOCUMENTS

2014/0310839 A1*  10/2014  Wickramasinghe ... G01Q 30/02
850/40

OTHER PUBLICATIONS

Bailo, Elena; Tip-Enhanced Raman Spectroscopy of Single RNA Strands: Towards a Novel Direct-Sequencing Method, 2008 Wiley-VCH Verlag GmbH & Co, Angew.Chem,Int.Ed 2008. 47, 1658-1661.
Hayazawa, Norihiko, "Highly reproducible tip-enhanced Raman scattering using an oxidized and metallized silicon cantilever tip as a tool for everyone"; J.Raman Spectroxc 2012 43, 1177-1182.
S. Hoffman, "Sputter depth profiling for thin-film analysis"; The Royal Society Publishing, vol. 362, No. 1814, pp. 55-75.

(Continued)

*Primary Examiner* — Jason McCormack
(74) *Attorney, Agent, or Firm* — D. Benjamin Borson; Borson Law Group, PC

(57) ABSTRACT

Aspects of the present invention include systems, devices, and methods of surface chemical analysis of solid samples, and particularly it relates to methods of chemical analysis of molecular compounds located either on or within thin surface layer of solid samples. Even more particularly, aspects of the present invention relate to systems, devices, and non-destructive methods combining both high sensitivity and high spatial resolution of analysis of chemical compounds located or distributed on the surface of solid samples with obtaining most important information regarding vibration spectra of atoms and molecular groups contained in thin surface layer of solid samples. These objectives are realized by implementation of computer-assisted systems that carefully regulate the motion of, and force applied to probes of atomic force microscopes.

10 Claims, 8 Drawing Sheets

(56) References Cited

OTHER PUBLICATIONS

A. Benninghoven, "Analysis of submonoloayers on silver by negative secondary ion emission"; phys.stat.sol. 34, K169 (1969).
R. Eckert, "X-Ray fluorescence in the SEM—Advantages in material analysis"; Scanning vol. 8, 232-238 (1986) FACM, Inc.
Chang, Chuan C., "Auger electron spectroscopy"; Surface Science 25 (1971) 53-79, North-Holland Publishing Co.

* cited by examiner

SYSTEMS AND METHODS FOR NON-DESTRUCTIVE SURFACE CHEMICAL ANALYSIS OF SAMPLES

CLAIM OF PRIORITY

This application claims priority to U.S. Provisional Patent Application No. 62/002,877 filed 25 May 2014 entitled "Systems and Methods for Non-Destructive Surface Chemical Analysis of Samples," Inventors: Sergey A. Saunin, Andrey V. Krayev, Vladimir V. Zhizhimontov, Vasily V. Gavrilyuk, Leonid N. Grigorov, Alexey V. Belyaev, and Dmitry Evplov. The contents of the above-identified provisional application are herein incorporated fully by reference.

FIELD OF THE INVENTION

Aspects of the present invention relate to systems and methods of surface chemical analysis of solid samples, and particularly it relates to methods of chemical analysis of molecular compounds located either on or within thin surface layer of solid samples. Even more particularly, aspects of the present invention relate to systems and non-destructive methods combining both high sensitivity and high spatial resolution of analysis of chemical compounds located or distributed on the surface of solid samples with obtaining most important information regarding vibration spectra of atoms and molecular groups contained in thin surface layer of solid samples.

BACKGROUND

Identifying and quantitating molecular structures on surfaces is an important aspect of manufacturing of many products, including computer wafers. In many situations, manufacture of such wafers requires numerous steps of chemical mechanical polishing, deposition of metal layers, deposition of dielectric materials, and deposition and removal of masking materials. Manufacturing steps have become critical to production of high-speed, small computing devices, such as main-frame computers, desk-top computers, laptop computers, hand-held computers, cellular telephones, tablet computers, digital watches, sensors, and numerous other modern devices. As the size of computer chips continues to decrease in size, and the density of elements, such as switches, diodes, capacitive elements, resistive elements and other features on chips increases, measurement of the surface features of wafers and chips during manufacturing is becoming increasingly important to production of high quality products.

Other products including machined parts for sophisticated devices are also improving in quality and accuracy. However, during manufacture of such products, environmental and manufacturing conditions may result in deposition of unwanted materials on the surfaces of such products and the parts that make up the products. As the accuracy and consistency of manufacture of many products increases, detection of contaminants is becoming more important.

SUMMARY

We have identified a new problem in the field, namely how to develop systems, devices, and methods that provide advantages of Tip Enhanced Raman Scattering ("TERS") phenomena and at the same time, provide increased sensitivity, increased spatial resolution and avoidance of damage to the scanned surface or probes used for TERS scanning.

Therefore, one aim of present invention is to develop such improved method of surface chemical analysis of solid samples which is non-destructive method and simultaneously possesses all previously known advantages of TERS phenomena in regard of excellent sensitivity and spatial resolution.

Another aim of present invention is to remove known disadvantages of prior art methods in which a scanning probe microscope is used as a part of analytical equipment.

One more aim of the present invention is to provide excellent reproducibility of results of chemical analysis if given sample is analyzed repeatedly as many times as necessary or desirable.

More particularly an aim of present invention is to develop such systems, devices, and methods in which neither a sample nor a tip of the needle used to participate in TERS phenomena can be damaged while scanning the surface of the sample.

A further aim of present invention is to develop such adjustable method in which high possible sensitivity of TERS phenomena can be achieved in accordance with each particular combination of the nature of the sample and chosen type of the probe to provide either TERS effect or any other optical effect (for example, laser-induced fluorescence) caused by laser illumination of sharp tip of scanning probe microscope.

In order to achieve all these aims the method of present invention combines three following general features:

I. The method of present invention fully removes a combination of two subsequent steps of prior art method causing damages to samples and probes, namely the combination of the step #2 with the step #3, both these steps specific for prior art discussed later. This combination corresponds to the only regime of prior art operation in which non-interrupted too tight direct contact (either electric or mechanical one) between the probe and the surface of solid sample is simultaneously combined with continuous movement of said probe along the surface.

II. A preliminary step of the method of present invention provides:

Step (a): Provide a device comprising a scanning probe microscope (SPM) operably linked with an optical spectrometer so that said device is capable of following operations:

(i) programmable switching between at least two different regimes of SPM operation while scanning of sample's surface;

(ii) changing position of a probe of said microscope relatively said sample in any of three dimensions in each of said two regimes, (iii) illuminating a sharp tip of said probe with a focused laser beam, (iv) collecting light emitted from proximity of said sharp tip for spectrometric analysis provided by said optical spectrometer; and (v) memorizing (storing in memory device) both current coordinates of the probe and results of said spectrometric analysis related to said current coordinates.

III. Non-destructive methods of the present invention are based on periodic switching between at least two different regimes in each particular point of surface chemical analysis wherein a specific aim of the first of said two regimes is safe preliminary observation of relief parameters of a chosen point, and a specific aim of the second regime is safe obtaining of chemical information from that point. That is why methods of present invention provide new sequences of main steps that surface chemical analysis is to be interrupted periodically in correlation with periodic switching between two different regimes of the scanning probe microscope, said switching resulting in fully modified trajectory of point-to-point relocation of the probe while scanning, which corresponds in general to periodic hopping (relocating) from one local area of the surface of the sample to a next one.

In order to achieve specific advantages of the feature III mentioned herein, methods of present invention comprise one or more of the following main steps repeated periodically.

Step (b): Initiate a first regime of said SPM, for example so-called intermittent contact regime in which controllable relocation of the probe along sample's surface is safe, whereas damage of both the tip and the sample are either reduced or fully avoided by keeping at least a predetermined minimum safe distance $D_{safe}$ between said sharp tip and a surface of the sample.

Step (c): Move either the probe or the sample in X-Y plane, which is substantially parallel to sample's surface, in order to locate said sharp tip of the probe over a desired point of the sample to be analyzed.

Step (d): Establish $Z_0$-position of the probe relatively either the sample or stable base of SPM, said $Z_0$-position providing at least said minimum distance $D_{safe}$ between said sharp tip and the surface of the sample in proximity of said desirable point.

Step (e): Switch SPM from said first regime to a second regime by changing at least one setting parameter of SPM operation. In some embodiments of present invention said change of at least one setting parameter may relate to change of predetermined value of feedback signal. In other embodiments said change of setting parameter may relate to a system operating with signals of at least one sensor associated with Z-position of the probe. In this case memorizing $Z_0$-position established in step (d) is required as well.

Step (f): Change Z-position of the probe using SPM operation in said second regime so that the probe gets a new Z-position=$Z_0$-position+$\Delta Z$, wherein $\Delta Z$ is a non-zero parameter satisfying programmatically following predetermined conditions:
  (i) said new Z-position is more appropriate for a tip enhanced Raman scattering of the light emitted from proximity of said sharp tip than $Z_0$-position, and
  (ii) said new Z-position results in reduced or no damage to both the sharp tip and the sample. In some cases depending on both the nature of the sample and material of the tip, said new Z-position may correspond to a decreased distance between the tip and sample's surface. In other, relatively rare cases, a new Z-position may correspond to an increased distance between these two elements;

Step (g): Illuminate said sharp tip of said probe with a focused laser beam;

Step (h): Collect the light emitted from proximity of said sharp tip;

Step (i): Initiate data recording, said data obtained from spectrometric analysis of said light by said optical spectrometer, said recording continuing for a predetermined time interval;

Step (j): Store in memory both data record accumulated while step (i) and coordinates of the probe corresponding to current point of analysis. The data obtained contain information related to chemical compounds located in chosen point on the surface;

Step (k): Interrupt data recording, namely said data recording related to present point of surface chemical analysis, and terminate the second regime of SPM operation in the end of a predetermined limited time interval in which the probe makes contact with the sample tightly;

Step (l): Terminate the method if the current point of chemical analysis is the last one. Otherwise return to step (b) in which SPM will be switched again to the first regime in order to:
  (i) relocate the probe safely to next desired point of the surface of the sample, and
  (ii) repeat the sequence of steps (c-l) for surface chemical analysis in next desired point.

In the last case the step (l) provide periodicity of the method of present invention and means to return to safe $Z_0$-position of the probe which decreases the likelihood of damage while traveling of the probe along main XY surface plane of the sample.

BRIEF DESCRIPTION OF THE DRAWINGS

This invention is described with reference to specific embodiments thereof. Other features of the systems and methods can be understood with reference to the figures, in which.

DETAILED DESCRIPTION

Figure 1:
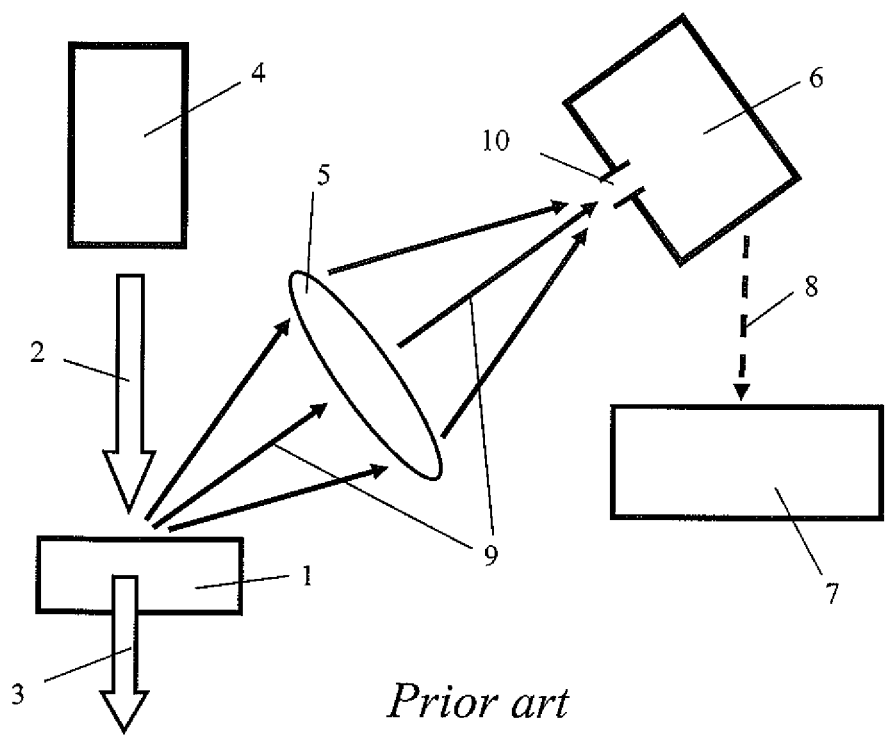
FIG. 1 depicts a general block-diagram of equipment used for traditional Raman spectroscopy.

One method of surface chemical analysis of solids, which is widely known, is based on phenomenon of X-ray fluorescence excited by high energy electron bombardment. This method uses: (a) combination of scanning electron microscope (SEM) with X-ray spectrometer and comprises, (b) bombardment of solid sample in vacuum by sharply focused electron beam having high energy, and (c) recording energetic distribution of secondary X-ray quanta emitted from surface layer of the sample. The information provided by this method relates only to element composition of surface layer of the sample and tells nothing about its molecular composition. Moderate spatial resolution of this method is typically about few microns by the order of magnitude in all three dimensions because it is limited by physical peculiarities of high energy electron scattering occurring inside solid materials. Few more technical details have been published by R. Eckert, *Scanning*, v. 8(5), p. 232-238, 1986.

Another method of surface chemical analysis of solids, known as X-ray photoelectron spectroscopy (abbreviated typically as XPS). This aspect method requires an additional preliminary step: (a) providing vacuum technique, namely X-ray photoelectron spectrometer, capable of measuring kinetic energy of electrons. This method further comprises steps: (b) irradiation of the sample in vacuum by X-ray beam, and (c) measuring kinetic energy of secondary photoelectrons emitted from surface layer of solid sample.

The general information provided by this method also relates mainly to the elemental composition of the surface layer of a solid sample, said surface layer having thickness about 5-10 nm. At the same time, spatial resolution of this method in the plane of the sample's surface is defined by the cross-section of the excitatory X-beam, which isn't better than few microns even with most advanced XPS devices. However, some fine details of the information following from kinetic energy measurements may relate to surface molecular compounds as well because these details can be interpreted in terms of energy of chemical bonds participating in connection of surface atoms. More details of this method can be found in the manuscript published by Nobel Prize winner K. Siegbahn et al: ESCA, Nova Acta Regiae Societatis Scientiarum Upsaliensis, UPPSALA, 1967 (Sweden).

An additional method of surface chemical analysis of solids is based on so-called Auger effect described in scientific literature (see, for example, Chuan C. Chang, *Surface Science*, Issue 1, p. 53-79, 1971). Both information abilities of Auger-method and its necessary steps (a, b, c) are similar to some extent to that of XPS method with the only significant difference that vacuum emission of secondary Auger-electrons initiated in step (b) comprise irradiation of a surface layer of the sample in a vacuum by a high energy electron beam. Spatial resolution of Auger-methods are also comparable by an order of magnitude with that of XPS-method described above.

All three methods listed above have been known and used for many decades notwithstanding they have significant disadvantages. First of all, they all require at least high vacuum technique, and preferably ultrahigh vacuum technique, which is complicated and expensive. Second, in regard of chemical analysis of surface layers sensitivities of these methods are relatively low, and spatial resolution related to X-Y surface plane of samples cannot be made better than about 1000 nm by the order of magnitude whereas spatial resolution in Z-direction orthogonal to said surface plane cannot be made better than 5-10 nm. Third, these methods cannot be considered as non-destructive because they all are using high energy irradiation of samples (typically at least few KeV or more) so that any material suffers more or less under such a condition. The same combination of disadvantages is fully applicable to secondary ion mass spectrometry method (SIMS) of surface chemical analysis in which irradiation of solid sample in vacuum is performed by high energy (about 1 KeV) ion beam. Additional technical details of SIMS method can be found in papers published by A. Benninghoven, *Physica Status Solidi*, v. 34(2), p. K169-171, 1969 and S. Hofmann, *Phil. Trans. R. Soc. Lond.*, v. A362, p. 55-75, 2004.

Recently, a different new method of surface chemical analysis became known. This method is based on discovery of a new physical phenomenon, namely Tip Enhanced Raman Scattering abbreviated hereinafter as TERS. Discovery of TERS can be considered as a next scientific step in well known Raman spectroscopy, in which an analyzed object is to be illuminated by monochromatic primary light having fixed wavelength $\lambda_0$ and, correspondingly, fixed frequency $v_0$. In response to illumination, the object scatters the light. Secondary light scattered by the object is analyzed by optical spectrometry for recording spectral distribution of said scattered light. The point is that a certain fraction of the light scattered by the object may have different wavelengths $\lambda \neq \lambda_0$ corresponding to other frequencies $v \neq v_0$ so that differences $\Delta v \sim (v-v_0)$ reflect vibration frequencies of atoms and molecular groups contained in this object. Such differential frequencies $\Delta v$ are known to be very specific for each particular molecule, therefore traditional Raman spectroscopy belongs to wide family of different methods of chemical analysis. Taking into account that primary light falls typically into the visible wavelength range corresponding to low energy of light quanta, the traditional Raman spectroscopy is thought as non-destructive method of chemical analysis.

For more clarity block-diagram of a device performing a method of traditional Raman spectroscopy is depicted in FIG. 1 wherein most critical components participating in the method are numerated as follows: 1—a sample (called also "an object" above), 2—primary light beam having fixed wavelength $\lambda_0$ (shown as thick white arrow), 3—non-scattered or elastically scattered light component having the same wavelength $\lambda_0$ (also shown as thick white arrow), 4—a laser producing primary monochromatic light beam, 5—a lens collecting scattered light, 6—optical spectrometer combined with recording system 7 so that information flow (shown with dashed arrow 8) is transferred to a computer. The scattered light beams (shown with thick black arrows 9) is collected by the lens 5 and transferred to input slit 10 of optical spectrometer 6 for further spectral analysis.

Figure 2:
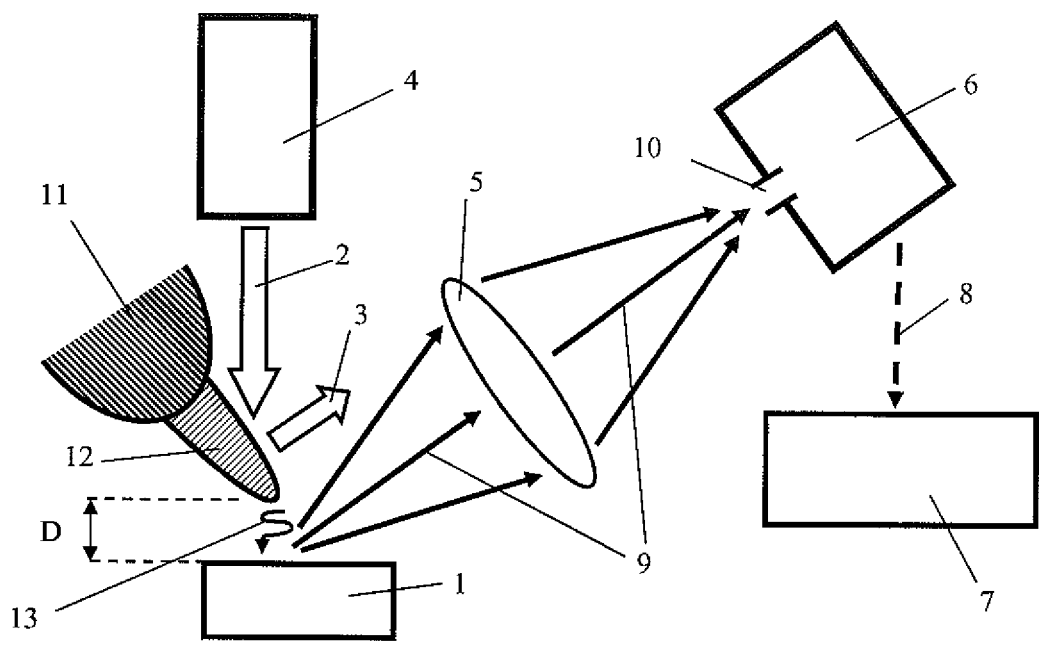
FIG. 2 depicts a general block-diagram of modified equipment for TERS spectroscopy.

However, prior Raman spectroscopy had relatively low sensitivity, which didn't allow using this method for high efficiency surface chemical analysis of solid samples. Discovery of phenomenon TERS changed this situation amazingly. There are two major features which make important differences between TERS and traditional Raman spectroscopy. The first major feature of TERS is that produced by the laser 4 primary light beam 2 is well focused onto sharp tip 12 of a needle 11 (FIG. 2), wherein said tip is made of a material containing appropriate concentration of free electrons. In other words, the tip appropriate for TERS must provide electric conductivity. In this case an intensity of focused primary light beam 2 can be made high enough to cause excitation of so-called plasmon oscillations of said free electrons so that frequencies of both a plasmon and primary light quanta are equal $v_0$. Another consequence of high intensity light illumination of sharp tip 12 and, correspondingly, the second major feature of TERS is that propagation of the plasmon along sharp tip is accompanied by appearance of extremely strong and well localized external electromagnetic field 13 having the same high frequency $v_0$ as primary light beam 2. This external field (shown in FIG. 2 as curly arrow 13) has rather limited volume concentrated in proximity of sharp edge of the tip 12. Typically this proximity is defined by low distance D between the tip 12 and the surface. At extremely low D the sharper end of the tip the better localization of the field 13 so that typical size of said high frequency electromagnetic field can be made as low as about 1 nm by the order of magnitude or, may be, even much less than 1 nm. Under such conditions any atomic group or any molecule located in the same proximity of the tip 12 becomes excited by localized strong field 13 and starts emitting secondary light quanta having specific frequencies v related to this particular atomic group or molecule. Spectral analysis of these secondary light quanta performed by optical spectrometer 6 combined with recording system 7 gives the information regarding chemical nature of atoms and/or molecules involved into such emission of secondary quanta.

In comparison with traditional Raman spectrometry the first advantage of TERS approach is that, due to so high intensity of the field 13, both an efficiency of emitting secondary quanta having specific frequencies and, correspondingly, sensitivity of TERS are enhanced many million times. The second advantage of TERS is sharply increased spatial resolution of chemical analysis because such enhanced emission relates only to chemical species localized in extremely low volume related to proximity of sharp tip 12.

The three previous paragraphs have been provided to clarify physical principles of TERS phenomenon used as a basis for advanced prior art methods of surface chemical analysis of solid samples. Practical approach described in scientific literature as prior art (see, for example, Norihiko Hayozava et al, *J. Raman Spectrosc.*, v. 43, p. 1177-1182, 2012) is depicted for clarity in FIG. 3 in the form of block-diagram. The prior art method comprises the following sequence of steps:

Step #1. Providing a device combining a scanning probe microscope 14 with an optical spectrometer 6 and recording system 7, wherein a probe is made in the form of conducting needle 11 having sharp tip 12. Prior art devices are always supplied with a feedback system participating in automatic operation of said microscope while scanning so that at least one parameter of said microscope 14 is permanently kept constant. Programmable automatic operation of both the microscope 14 and recording system 7 is controlled by a computer 25. The devices known in prior art are also capable of:

(i) illuminating a sharp tip 12 of the needle 11 with focused laser beam 2;

(ii) collecting a light emitted from proximity of said sharp tip 12 (actually collecting both elastically scattered light component 3 and non-elastically scattered light 9) for spectrometric analysis provided by said optical spectrometer 6; and (iii) storing in memory both coordinates of the needle 11 and results of said analysis related to these coordinates.

Step #2. Initiating a regime of said scanning probe microscope 14 in which the tip 12 of the needle 11 touches firmly the surface of sample 1 to provide permanent mechanical contact. In order to stabilize such regime said feedback system automatically keeps chosen feedback parameter equal to a certain predetermined constant. In some embodiments of prior art, this feedback parameter is associated with a predetermined constant force of interaction between said tip and said surface so that resulting actual force corresponds to at least tight mechanical contact of the tip and the surface. In other embodiments of the prior art, said feedback parameter may relate to a predetermined constant tunnel current. In this case the tip 12 presses the sample 1 even tighter and the actual force of such enhanced electric contact is typically much higher than just force of tight mechanical contact.

Because the force of mechanical contact (typically about $10^{-8}$ N by an order of magnitude) is so high and effective area of typical tip 12 may be as low as about $10^{-14}$ cm$^2$ by an order of magnitude the continuous pressure applied by tip 12 to sample 1 may exceed $10^6$ N/cm$^2$ resulting in irreversible deformation of either the tip or the sample, or both. For example, any metal undergoes strong plastic deformation under continuous pressure exceeding $10^5$ N/cm$^2$. Step #3. Moving the needle 11 continuously in the direction which is substantially parallel to surface X-Y plane of the sample 1 (see FIG. 4). In accordance with the regime established in the step #2 this moving occurs simultaneously with permanent automatic keeping of predetermined feedback parameter. Correspondingly, either the tunnel current or the force of tight mechanical contact of the tip 12 with the surface of sample 1 remains constant while said moving. Because microscopic details of surface relief may be rather complicated, maintaining of either the force or tunnel current results in automatic displacement of the needle 11 relatively the sample in Z-direction which is substantially orthogonal to said surface. Dotted line 16 in FIG. 4 shows an example of expected ideal trajectory of needle 11 and its tip 12 in accordance with a regime provided by the step #2.

Figure 4:
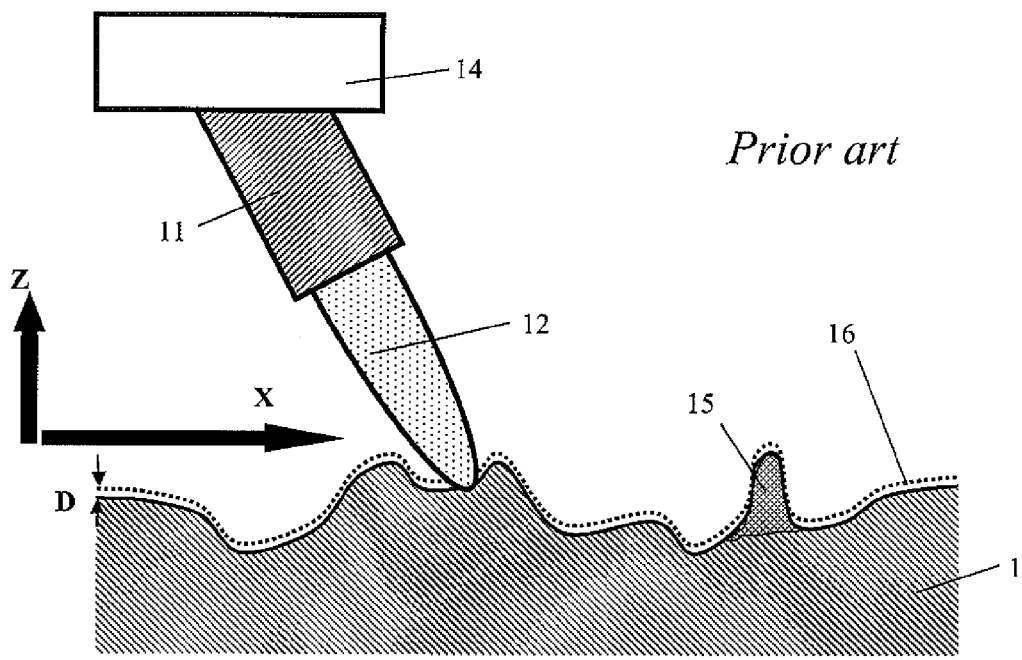
FIG. 4 depicts a trajectory of needle relocation used in typical regime of prior art method providing microscopic chemical analysis of samples having complicated surface relief
Figure 5:
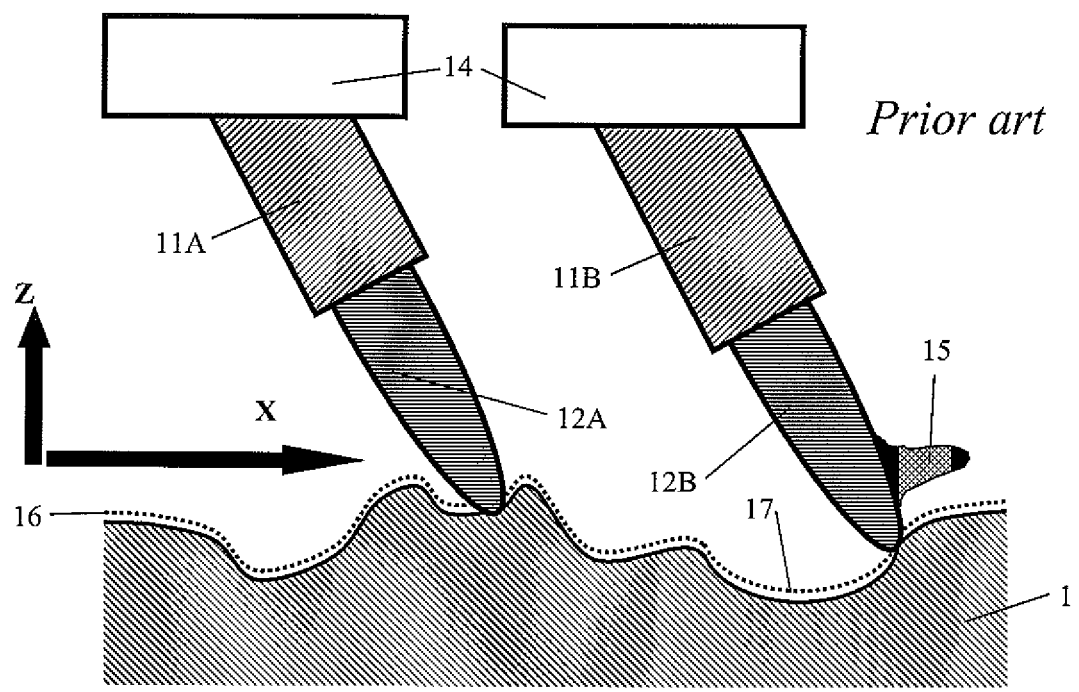
FIG. 5 depicts one of the disadvantages typical of prior art methods.

However, in reality the tip 12 moving continuously along the surface with simultaneous keeping both extremely low distance D and extremely high permanent pressure can work as a cutting instrument causing scratches 17 on the surface of sample 1 (compare ideal FIG. 4 and more realistic FIG. 5).

Step #4. Illuminating sharp tip 12 of the needle 11 continuously with focused laser beam 2.

Step #5. Collecting the light emitted from proximity of said sharp tip 12 with simultaneous non-interrupted spectrometric analyzing of said light by said optical spectrometer 6. This step comprises accumulation of results of spectrometric analysis by recording system 7 for predetermined time interval. However, in prior art methods, there is no need to interrupt analyzing procedure because extremely low distance D between the tip 12 and the surface (see FIG. 3 and FIG. 4) remains constant with time.

Step #6. Store results in memory of spectrometric information accumulated during step #5, together with mean coordinates of the needle 11 corresponding to relatively small current local surface area of analysis. Thus, results of spectrometric analysis reflect surface chemical composition in each small local surface area of sample 1 which is currently analyzed. The length of each small current local surface area of the analysis is defined by a product resulting from multiplication of a speed of continuous moving (see step #3) by predetermined accumulation time (see step #5). An example depicted in FIG. 4 shows that certain small local surface area of the sample 1 may contain molecular cluster 15 which is chemically different from composition of other small surface areas. Correspondingly, memorized results of chemical analysis in this particular area are to be different from results related to other areas.

Step #7. Return to step #5 in order to provide surface chemical analysis in next small local surface area of the sample, said next area adjacent to local area already analyzed in step numbers 3-6. Some features of prior art methods described above are as follows:

(i) In the ideal case, a microscopic resolution of chemical analysis in X-Y plane may be as high as about 1 nm by an order of magnitude.

(ii) Chemical information obtained relates only to extremely thin surface layer having thickness about 1 nm or less.

(iii) In some cases high sensitivity of microscopic chemical analysis may correspond to observation of small molecular clusters or even single molecules located on the surface and occupying negligibly small volume about 1 nm³ by the order of magnitude.

However, methods of the prior art cannot be considered as non-destructive methods of surface chemical analysis because of the important disadvantages listed below:

(a) Maintaining a tight mechanical contact between the sample 1 and the tip 12 made of hard material results in too strong a force applied to sample's surface permanently while scanning. This high force may cause irreversible damage to the sample, especially in cases when either some or all of the sample or some of its parts are softer than the tip 12. Correspondingly, information regarding chemical state of the sample's surface becomes irreproducible. Comparison of FIG. 4 and FIG. 5 demonstrates an example of such partial damage caused by cutting effect of rather strong permanent pressure applied by sharp tip 12 while its continuous moving along the surface from position 12A to position 12S.

(b) The damage mentioned in point (a) immediately above are a result of surface scratching caused by moving hard tip 12 along the surface relief simultaneously with application of strong compressive pressure. This scratching leads to non controllable relocation of microscopic portions of surface material so that at least some chemical particles located initially on the surface may be relocated to other surface points and further adhered to the tip 12 as, for example, molecular cluster 15 in FIG. 5. In fact, movement of the tip 12 together with adherent cluster 15 is equivalent to the use of dirty needle 11 contaminated unpredictably with unknown chemical compounds. However, this contamination occurs in proximity of the tip 12 where chemical information is produced in the form of non-elastically scattered light. If such non-controllable contamination occurs in the step numbers 4, 5 of prior art methods, the result will be non controllable and incorrect chemical information in regard of such points of sample's surface where this cluster 15 has never been before.

Figure 6:
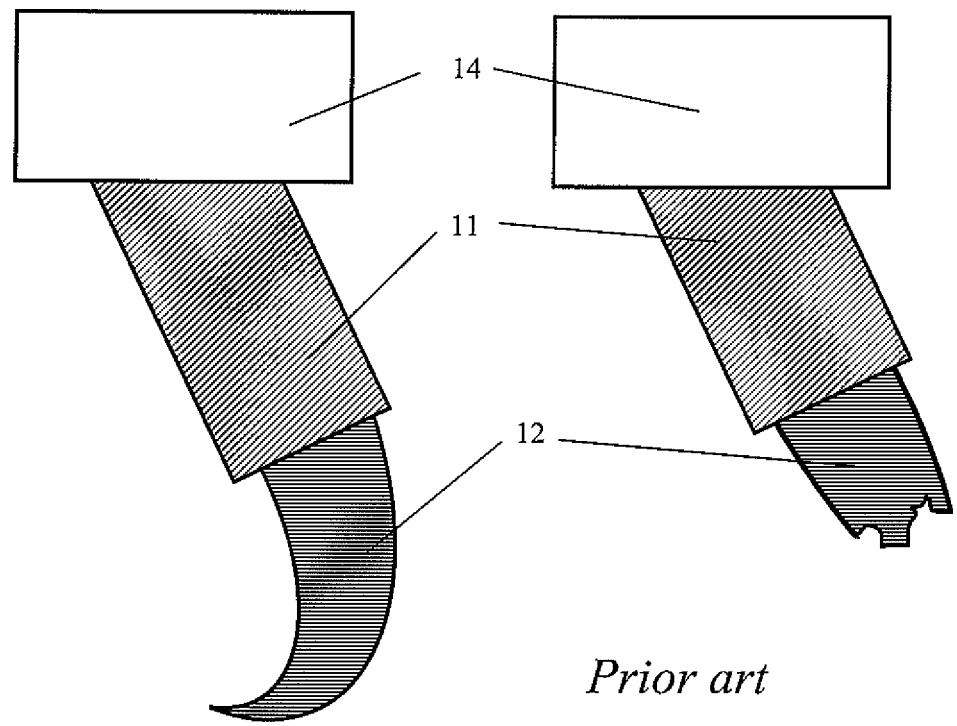
FIG. 6 depicts another disadvantage typical of prior art methods.

(c) Strong compressive force applied permanently to the needle 11 in all step numbers 2-7 of prior art methods may also result in irreversible and practically non-controllable damage to the tip 12 while scanning if whole sample or some its parts are harder than the tip 12. In this case the tip 12 can be either deformed as shown on left side of FIG. 6 or broken completely (see right side of FIG. 6). Regardless of what kind of damage occurs, such damage leads to serious violation of optimal conditions of surface chemical analysis and, correspondingly, results in either lost spatial resolution or decreased sensitivity, or both. In any case this situation leads to incorrect and non reproducible results.

Another disadvantage of prior art methods described above is that they don't provide as high chemical sensitivity as can be expected in principle on the basis of TERS phenomena. The point is that existing methods don't take into account that the nature of samples may be different and the tip 12 can be made of multiple materials having different physical properties. However, prior to the present invention, there are no theoretical or experimental bases to support the notion that only a tight direct mechanical contact between the tip 12 and sample's surface provides the best efficiency of TERS analysis, independently of potential variations of material of the tip and physical nature of the sample.

The systems, devices, and methods disclosed herein address these problems and for the first time, permit accurate, reproducible, sensitive, and spatially accurate analyses of surfaces using TERS.

Description of Embodiments

We have identified a new problem in the art, namely, how to provide systems, devices, and methods that can be used to determine chemical identities of substances on the surface of a solid object. Additionally, we have provided new systems, devices and methods to achieve this important result. In certain aspects, the invention uses a computer processor comprising computer memory, programmed to accept, store, and analyze information obtained using optical and mechanical devices as described herein.

Technical Features of Devices for Step (a) of the Invention

Figure 3:
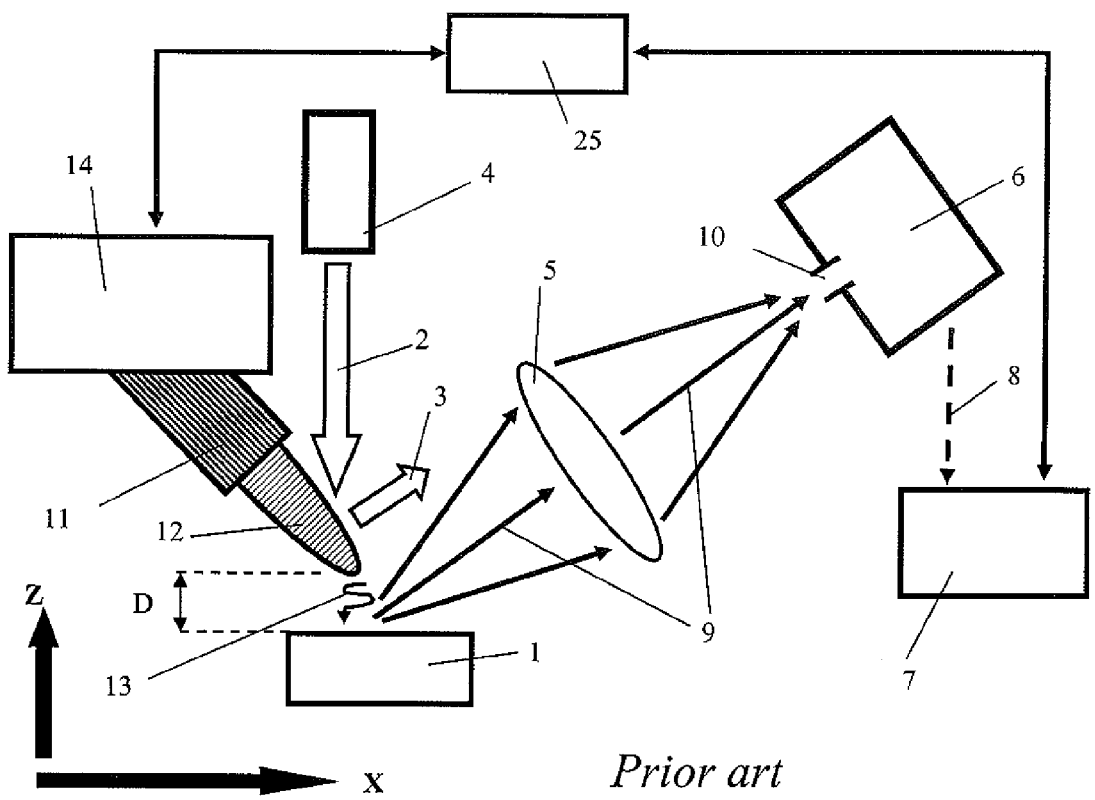
FIG. 3 depicts a general block-diagram of equipment used for the method of the invention.

Non-destructive methods of surface chemical analysis of the present invention are based on use of a device comprising a scanning probe microscope (SPM) 14 operably linked with an optical spectrometer 6 which is connected with recording system 7 accordingly to general block-diagram depicted in FIG. 3. Additional technical details of the same equipment are shown also in FIG. 7. SPM 14 is programmatically operated mechanism which is capable of changing position of a probe 18 relatively a sample 1 in any of three dimensions. Different probes 18 can be used but in any case the probe 18 of present invention must comprise the needle 11 supplied with sharp tip 12 having appropriate concentration of free electrons. The device used must also be supplied with a laser 4 producing primary light beam 2 which is focused onto sharp tip 12 in order to excite plasmons resulting in appearance of strong high frequency electromagnetic field 13 near the end of this tip. The secondary light scattered from proximity of the tip 12 includes both not useful elastically scattered light component 3 and non-elastically scattered light beams 9 which may contain useful chemical information. Optical elements such as mirror or, for example, lens 5 are used to collect all light beams emitted from proximity of sharp tip 12 for spectrometric analysis provided by optical spectrometer 6. Results of said spectrometric analysis are recorded by system 7 and reflect chemical composition of a substance located within extremely low volume in proximity of the tip 12.

A programmable, controlled recording system 7 can also store in memory all three coordinates related to current position of probe 18 at any moment of the analysis. Hereinafter coordinates X and Y are considered as coordinates of X-Y plane which is substantially parallel to the surface of sample 1. At the same time the coordinate Z is substantially orthogonal to X-Y plane and is considered hereinafter as a variable associated with a distance D between the tip 12 and the surface of sample 1. At any time moment the information regarding current X-, Y-, and Z-coordinates of the probe 18 is kept in controlling computer 25 (see FIG. 3) which defines programmatically all actions of both the microscope 14 and recording system 7.

It may be desirable in advanced and precise embodiments, that a scanning mechanism of SPM 14 providing X, Y, and Z relocations of the probe 18 is supplied with special distance sensor 22 which is capable of measuring variable Z-position of the probe 18 relatively certain immovable element such as stable base 23 (see FIG. 7) and directing this information to controlling computer 25 shown in FIG. 3. For example, sensor 22 may be a capacitance sensor having sensitivity better than 0.01 nm. It may be desirable also that the microscope 14 is supplied with similar distance sensors related to X and Y coordinates.

Figure 7:
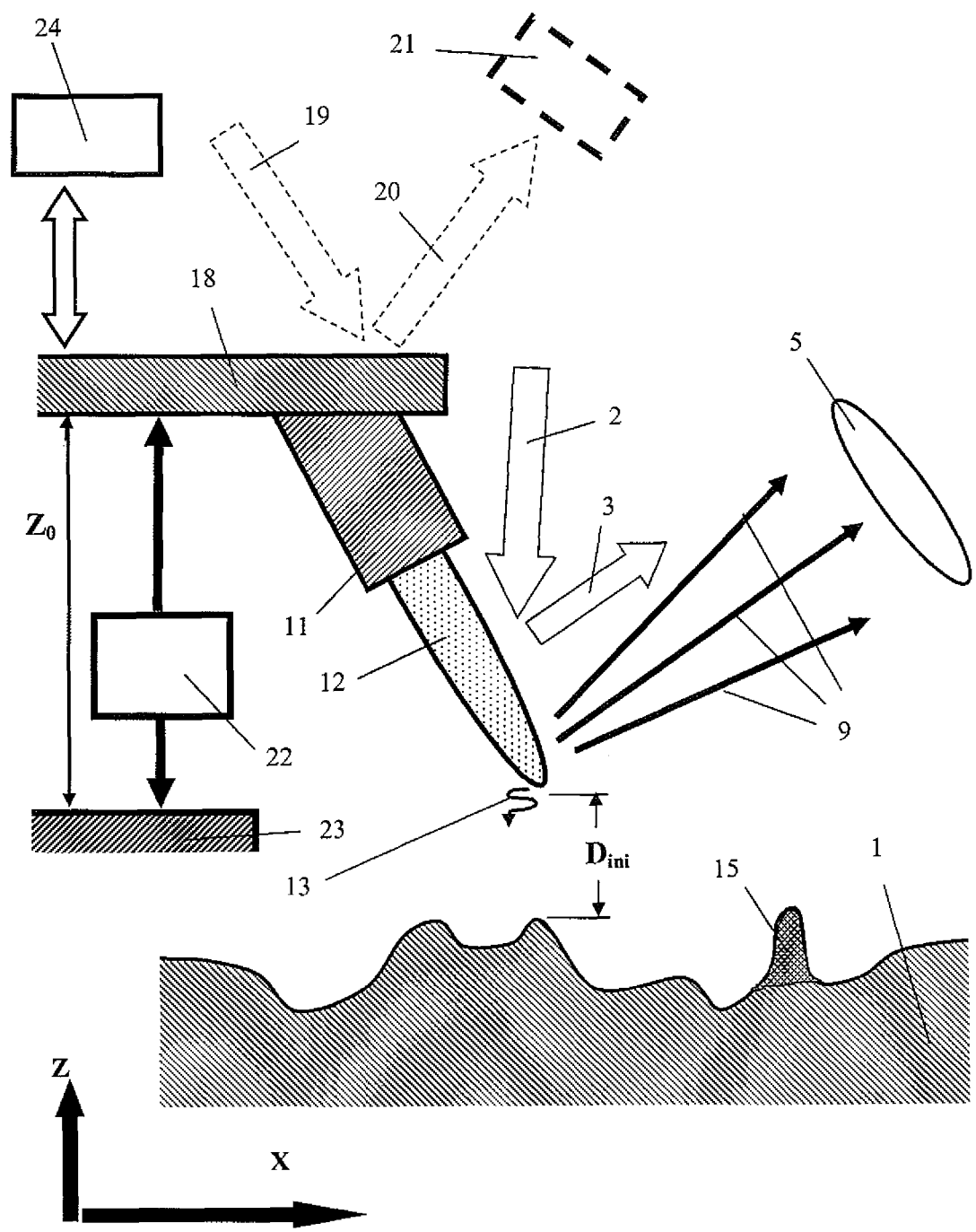
FIG. 7 depicts additional technical details of a device used for the method of the invention.

Presence of a advanced type of sensor 22 in design of SPM 14 is especially desirable wherein the probe 18 is represented by a piezoelectric resonator. For example, this may be a quartz resonator having Such implementation of quartz U-resonator for the use in SPM applications is often called as "tuning fork." In this case the needle 11 is to be connected with one leg of two of said U-resonator (FIG. 7 shows only one leg of the probe 18). It can be noted that SPM 14 charged with either U-form probe 18 containing quartz resonator or other type of piezoelectric resonator can be also supplied with electronic system 24 capable of both exciting oscillation of the needle 11 and accepting piezoelectric signals produced by deformed probe 18. This 2-way electronic communication between the probe 18 and the system 24 is shown in FIG. 7 as double-directed thick white arrow. Piezoelectric signals created by either "tuning fork" or other type of piezoelectric resonator is usually used as feedback signal for SPM operation while scanning the surface of the sample 1.

In other embodiments, probe 18 can be made in the form of traditional cantilever having light reflecting area on its free end. In this case electronic system 24 supplied with piezoelectric element is used only to excite oscillation of said free end whereas a feedback signal is created by another system 21 supplied with multi-segment optical detector. In order to do so the light reflecting free end of the probe 18 is illuminated by another focused laser beam 19 whereas deflection or other deformation of said free end is optically detected as deviation of reflected beam 20. Note that elements 19, 20, and 21 are used for SPM operation only and don't participate in TERS measurements. In FIG. 7 elements 19, 20, and 21 are shown with dashed lines in order to stress that optical detection of deformation of the probe 18 is just an option depending on what kind of the probe is used in each particular case. However the use of distance sensor 22 can be appreciated because it increases precision of SPM operation and makes results reproducible.

The device of step (a) has an additional novel technical feature which can be useful for methods of present invention and makes a principal difference between the invention and prior art methods. The point is that scanning regime of any SPM, and correspondingly, the regime of obtaining chemical information by a device depicted in FIG. 3, is defined by current combination of setting parameters kept by controlling computer 25. In prior art methods this combination of setting parameters is established by the user before beginning of scanning and doesn't change during scanning process. That means that at least one important setting parameter, for example certain predetermined value of feedback signal, is permanently kept constant during scan in prior art methods. The result is that in prior art only one regime of microscope 14 operations is used for both relocation of the needle 11 along the surface and accumulation of chemical information by recording system 7.

In contrast to the prior art methods, the systems, devices, and methods of the present invention comprise a scanning probe microscope 14 that can be capable of periodic programmable switching of at least one setting parameter while scanning, so that it results in periodic switching between at least two different regimes of microscope operation. The first regime of said two regimes of microscope 14 operations is aimed to provide safe preliminary observation of certain chosen point of sample's surface and to get preliminary setting information necessary for safe operation in second regime, whereas the second regime is characterized by changing at least one setting parameter of microscope 14 so that safe obtaining of chemical information from the same chosen point becomes possible. Correspondingly the recording system 7 of the device of the invention must be capable of correlating accumulation of chemical data in accordance with switching said two regimes of microscope 14. This correlation may be provided in different forms, including but not limited to interruption of data accumulation while the first regime providing preliminary observation of certain chosen point of sample's surface. It should be also appreciated that saying word "safe" in regard of both said regimes authors of present invention mean such two regimes of microscope 14 operations that neither the sample 1 nor the probe 18 (including its sharp tip 12) can be damaged in each of two said regimes.

Thus, step (a) of present invention provides systems, devices, and methods in which all necessary technical features mentioned in this section are combined together.

Advantages of the Present Invention Over Prior Art

The disadvantages of prior art methods, such as irreproducibility of results and damage to either the probe or the sample, or both, originate from natural combination of three following factors:

1. Highly effective microscopic surface chemical analysis, such as for example TERS analysis or alike, requires typically extremely low distance D between the tip 12 of the needle 11 and the surface of the sample 1. In most cases D must be much less than 1 nm, for example it requires D about 0.1 nm or less. Hereinafter all quantitative estimates of physical and technical parameters are given in present specification in assumption that typical sharp tip 12 has very low curvature radius expressed in nanometer units.

2. Because results of each individual point-like surface chemical analysis relate to extremely low area (about or less than 1 $nm^2$) the analysis of full surface includes plurality of points and whole analytical procedure takes substantial time (typically many minutes) even with as low full area of surface analysis as about 100×100 $nm^2$.

3. In framework of operations typical for prior art methods any attempt to keep such low D continuously results in so strong force F of interaction between the probe and the surface (typically about $10^{-8}$ N) and so high local pressure (typically above $10^6$ $N/cm^2$) which can cause irreparable damage to either the sample or the probe, or both.

Therefore, we searched for ways to avoid the disadvantages of the prior art, and developed systems, devices, and methods which can result in real-time, continuously adjust force F of interaction of the probe with the surface even if the distance D between them remains as low as required accordingly to the point 1 above.

We have carried out a series of experiments and made a first discovery that at most typical ambient conditions, (including but not limited to the temperature, atmospheric pressure, etc.), the mentioned above force F strongly depends on both the distance D and contact time $\tau$. We found that even in the case of as sharp tip 12 as possible and extremely low D corresponding to mechanical contact an initial F (at $\tau=0$) can be significantly reduced and made relatively low in between $10^{-9}$ N and $10^{-10}$ N by the order of magnitude. At $\tau>0$ and constant D mentioned above this force increases gradually and becomes stationary value up to about $10^{-8}$ N by an order of magnitude in a relatively short saturation time $\tau_{sat}$, which is typically in between 1 and 10 seconds. The dependence of saturation time on external conditions and materials brought in contact is not fully understood, but having discovered the phenomenon and how to adjust conditions in real time provides a distinct improvement in TERS analysis of chemical components, with reduced damage to the sample or equipment, and with increased sensitivity, and increased spatial resolution.

This discovery revealed a correct direction for development of non-destructive methods of the present invention for microscopic surface chemical analysis. Experiments resulted in another important discovery that either negligibly low or no damage at all are produced in most cases to both sharp tip 12 and typical solid samples like metals or silicon if duration of mechanical contact $\tau_{cont}$ executed in each particular point of sample's surface is limited accordingly to condition $\tau_{cont} \ll \tau_{sat}$. Therefore a physical principle of non-destructive method of present invention can be expressed as follows.

The time of mechanical contact $\tau_{cont}$ of the tip 12 and the sample 1 must be shorter than saturation time $\tau_{sat}$. The softer material of the sample the shorter duration $\tau_{cont}$ of mechanical contact between sharp tip 12 and sample's surface. For many practical applications a condition $\tau_{cont} \leq 0.2$ sec may be used in multiple cases of relatively hard samples, and more restrictive condition $\tau_{cont} \leq 0.05$ sec may be desirable from time to time to explore softer samples. However, exact numeric limits of $\tau_{cont}$ are provided above for example only, and different limitations of $\tau_{cont}$ can be used as well, depending on each particular combination of both the sample and the tip 12. For example, even contact time as short as $\tau_{cont}$ in between 0.001 sec and 0.01 sec may be used in some specific cases.

Figure 8:
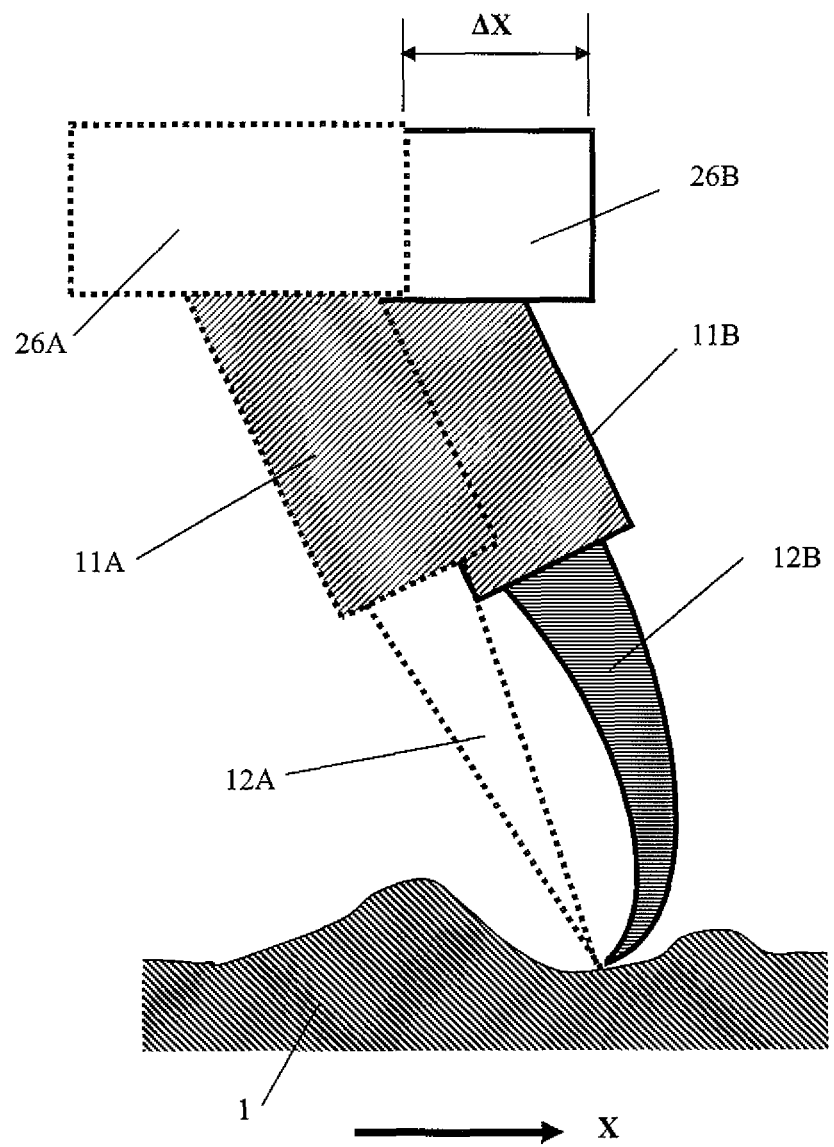
FIG. 8 depicts short-term elastic deformation of the probe while continuous scanning if the probe contacts the surface for limited contact time.

We made another discovery, that non-destructive TERS surface chemical analysis can be done successfully if during short $\tau_{cont}$ the needle 11 moves relatively the surface of the sample 1 with as low relative velocity as possible. In an ideal case causing practically no damage, it may be desirable that during $\tau_{cont}$ sharp tip 12 of the needle 11 doesn't move relatively the surface of the sample 1 at all. FIG. 8 demonstrates such a possibility, which uses elastic properties of sharp tip 12. FIG. 8 shows positions of elements of SPM, namely a scanner 26, the needle 11, and its tip 12, at two different time states A and B, where the time state A corresponds to the very beginning of the contact time $\tau_{cont}$ and the time state B corresponds to the end of short contact time $\tau_{cont}$. For better visualization in time state A all elements are shown with dotted lines, and the same elements in time state B are shown with solid lines.

One can appreciate that in the beginning of the contact sharp tip 12A is not deformed. In this initial moment A, mechanical contact is already established and the pressure applied by the tip to the sample 1 is accompanied by immediate appearance of a tangential friction force which holds the lower part of the tip 12 in the same contact point all the time. If scanner 26 moves in X-direction, it shifts the upper part of the needle 11 so that at final contact moment B, this shift is equal $\Delta X = S\tau_{cont}$ wherein S is predetermined speed of scanning. The shift of upper part of the needle (position 11B) and fixed contact position of its lower part (namely contact point of the tip 12B) results in certain deformation of the tip 12B as shown in FIG. 8. This deformation is proportional to $\Delta X = S\tau_{cont}$ and is non-destructive elastic deformation if $\Delta X$ is low enough. In order to keep such deformation low in safe brackets of non-destructive elastic deformation and prevent damage of either sample or the probe, one can use either low speed S or low $\tau_{cont}$, or low both parameters.

As a quantitative example only, one can choose a moderate scanning speed S=1 micron/sec and low $\tau_{cont}$=0.003 sec. In this case the deformation of whole needle 11 can remain a non-destructive elastic deformation because it doesn't exceed a low value $\Delta X$=3 nm which is few orders of magnitude less than full length of the needle (typically about 10 microns). On the other hand, this example explains why typical or prior art method long $\tau_{cont}$>1 sec leads to much higher deformation $\Delta X$>1 micron. Such high deformation exceeds brackets of elastic deformation, and can result in either a broken tip (see FIG. 6) or scratched sample (see FIG. 5). As a result of the second discovery, we came to a conclusion that non-destructive TERS surface chemical analysis can be made based on two modifications.

Figure 9:
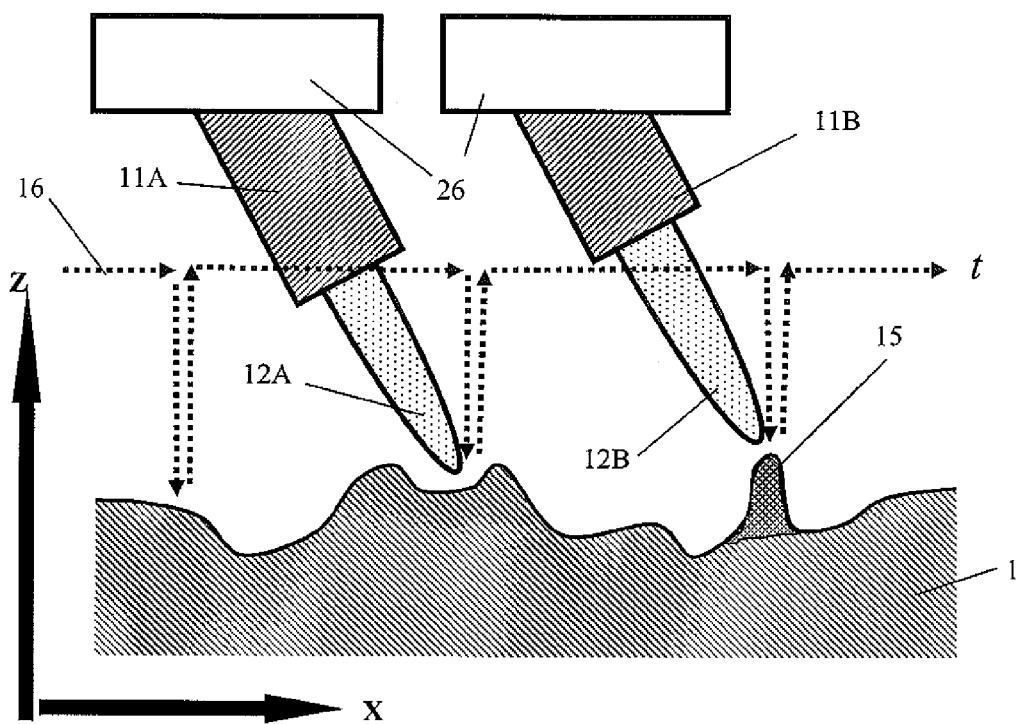
FIG. 9 depicts trajectory of non-destructive movement of the probe used in one of few modifications of the method of the invention.

One modification of the method allows keeping relatively high or moderate constant scanning speed S in the case of rather short contact time $\tau_{cont}$ which is desirably shorter than 0.03 sec by an order of magnitude. That means that transition of the tip 12 between adjacent points of analysis in time can be done accordingly to a diagram shown in FIG. 9, wherein the trajectory of movement of tip 12 from point-to-point is shown with a dotted line. At each point of the analysis, short contact time $\tau_{cont}$ corresponds to decreased distance between the tip and sample's surface, whereas transition from one point to the next one occurs at safely higher distance to avoid potential damage. FIG. 9 shows also that in this modification the time of surface analysis may be shorter than point-to-point transition time.

Figure 10:
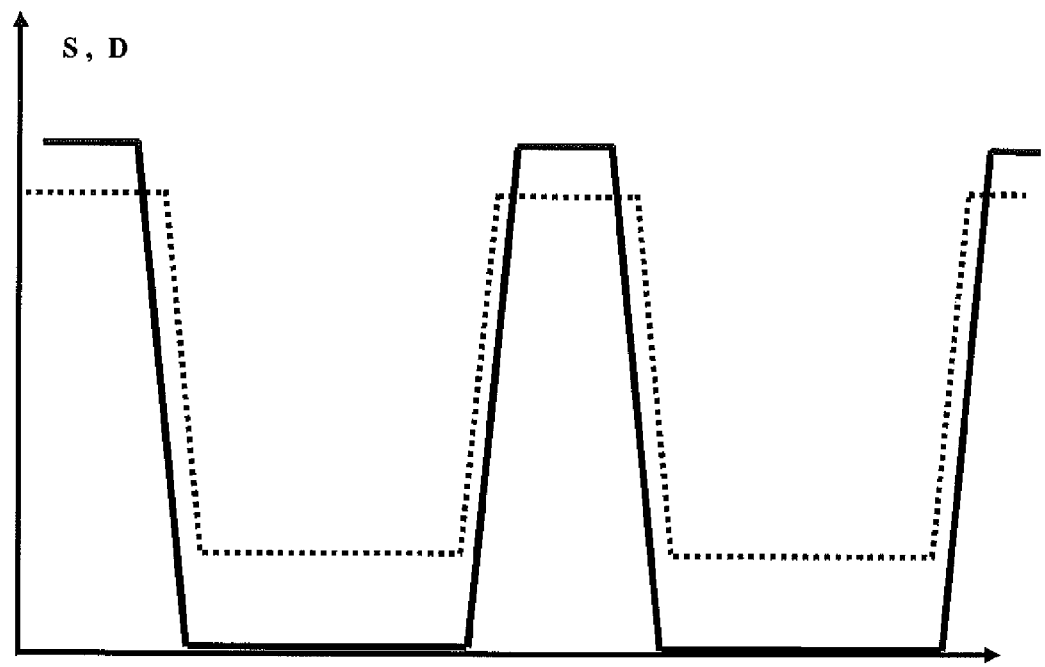
FIG. 10 depicts time-diagrams of scanning speed (solid line) and the distance between the probe and the sample (dotted line) in another modification of the method of the invention.

Another modification of the method can be desirable if non-destructive TERS surface chemical analysis of particular sample requires increased $\tau_{cont} \gg 0.03$ sec. In this case, it can be desirable that during $\tau_{cont}$ in each particular point of surface analysis, the scanning speed S is greatly reduced, and even more desirable S is made equal zero during $\tau_{cont}$. However, in order for complete analysis of a full sample area in reasonable time, one can interrupt contacts periodically and provide high speed transition of the probe from one surface point to next one. In this modification the scanning speed S can be changed periodically as shown in time-diagram of FIG. 10, wherein dependence S(t) is represented by a solid line, and the dotted line shows the dependence D(t) for distance between the tip 12 and the surface of the sample.

The novel and non-obvious discoveries are self-consistent in such respect that in order to provide non-destructive TERS analysis, both discoveries can benefit from certain limitations of time interval $\tau_{cont}$ related to time of appropriate tight contact between the tip of the probe and the surface of the sample in each point of chemical analysis. While scanning certain area of the sample, the present invention provides for and benefits from periodic interruption of tight contact between the sharp tip of the probe and the surface of the sample. As a result, each period of the invented methods includes: (i) bringing the probe into appropriate contact with one point of the sample, (ii) making chemical analysis of this point during limited time interval $\tau_{cont}$ with the use of TERS procedure, (iii) terminating said contact by increasing the distance between the probe and the sample, and (iv) relocating the probe into another point of the analysis. Exemplary technical details of invented method are disclosed herein below.

General Structure of Preferred Embodiments

The first (preliminary) step of the non-destructive method of present invention comprises:

Step (a) providing a device comprising a suitably programmed computer, a scanning probe microscope (SPM) operably linked with an optical spectrometer so that said device is capable of following operations:

(i) programmable switching between at least two different regimes of SPM operation while scanning of sample's surface, said scanning understood as microscopic measurements done in at least one point of the sample and desirably in more than one point;

(ii) changing position of a probe of said microscope relatively said sample in any of three dimensions in each of said two regimes, (iii) illuminating a sharp tip of said probe with focused laser beam, (iv) collecting a light emitted from proximity of said sharp tip for spectrometric analysis provided by said optical spectrometer; and (v) storing in memory both current coordinates of the probe and results of said spectrometric analysis related to said current coordinates.

It is to be noted that technical features (i-v) of the step (a) can be desirable for the method of present invention. However it has to be understood that some other technical feature of the equipment may be also desirable in order to improve performance and deliver additional useful information to users. For example only, the device of the step (a) may be also supplied with software capable of mapping a distribution of chemical compounds over scanned area of the sample.

Some other useful technical features may be included as well. For example, it may be very useful and desirable that at any time moment all three coordinates X, Y, and Z of the probe 18 relatively the sample are measured by corresponding sensors 22 providing high precision of such coordinate measurement. It is desirable that SPM used in this invention is capable of programmable relocating the probe 18 with the use of either data of sensors 22 or feedback signals created by corresponding feedback system(s). The point (i) above assumes that the SPM of the invention is capable of programmable switching between these two possibilities (actually, between two different regimes) of the operation. Correspondingly, the point (ii) above also assumes that desirable changing position of a probe can be provided in any of said two different regimes.

It also can be desirable that SPM used in this invention is supplied with electronic system 24 capable of exciting oscillation of probe 18 with the needle 11. System 24 can accept a piezoelectric signal produced by deformed probe 18 made as piezoelectric resonator. This 2-way electronic communication between the probe 18 and the system 24 is shown in FIG. 7 as double-directed thick white arrow. The piezoelectric signal created by either "tuning fork" or other type of piezoelectric resonator is usually used as feedback signal for SPM operation while scanning the surface of the sample 1. However, if the probe 18 is represented by traditional cantilever supplied with sharp needle 11 the feedback signal of SPM of the invention is to be created by another system 21 supplied with multi-segment optical detector, said detector participating in so-called "optical lever system" shown in FIG. 7 with dashed arrows 19 and 20.

Further Operations Based on Step (a)

Non-destructive systems, devices, and methods of the present invention are based on periodic switching between at least two different regimes in each particular point of surface chemical analysis wherein the specific aim of the first regime of said two is safe preliminary observation of certain relief parameters of chosen point, and the specific aim of the second regime is safe obtaining of chemical information from that point. That is why the method of present invention provides such new sequence of main steps that both tight contact of the probe with the sample and surface chemical analysis are to be interrupted periodically in correlation with periodic switching between two different regimes of scanning probe microscope, said switching resulting in fully modified trajectory of point-to-point relocation of the probe while scanning which corresponds in general to periodic hoping from one local surface area of the sample to next one.

By the term, "different regimes" of SPM operations, we mean that in each regime a behavior of a device is based on specific settings stored in computer's memory. Any change of said settings can cause the change of said regime of operation.

For example, one setting (and correspondingly one regime) may relate to predetermined feedback signal, and SPM behaves so that said feedback signal is kept in predetermined technical brackets. In this case coordinate sensors 22 play the role of passive recording elements providing coordinate information to controlling computer 25. Feedback signal(s) may relate to high frequency oscillation of the probe 18, or to phase shift of these oscillation relatively exciting voltage of the system 24, or to doubled amplitude 2A of said oscillation (see FIG. 11).

As an example of another regime, the setting may relate to predetermined deformation of the probe 18, said deformation resulting from the interaction of sharp tip 12 of the probe with the sample 1. Keeping predetermined deformation is based on signals sent to computer 25 by either system 24 explained before or by optical detector system 21. In this case all previous parameters related to oscillation of the probe become passive and do not influence behavior of SPM even if they are recorded by controlling computer.

One more different regime is available if coordinate setting becomes dominant programmatically. In this case controlling computer operates predetermined relocation of the probe on the basis of data obtained from coordinate sensors 22. At the same time all other parameters play only passive information role which doesn't influence the behavior of SPM.

The said above in three previous paragraphs have to be taken into account for better understanding of the information provided below. In order to achieve specific advantages related to non-destructive and well reproducible chemical analysis of the surface, the method of present invention comprises following main steps repeated periodically.

First, a general set of steps is represented below to demonstrate operations involved. However, in different embodiments each particular step may be performed with the use of different technical details, or may include some additional sub-steps. These additional details will be disclosed later. Thus, a general set of steps can be represented by one or more of the following steps.

Figure 11:
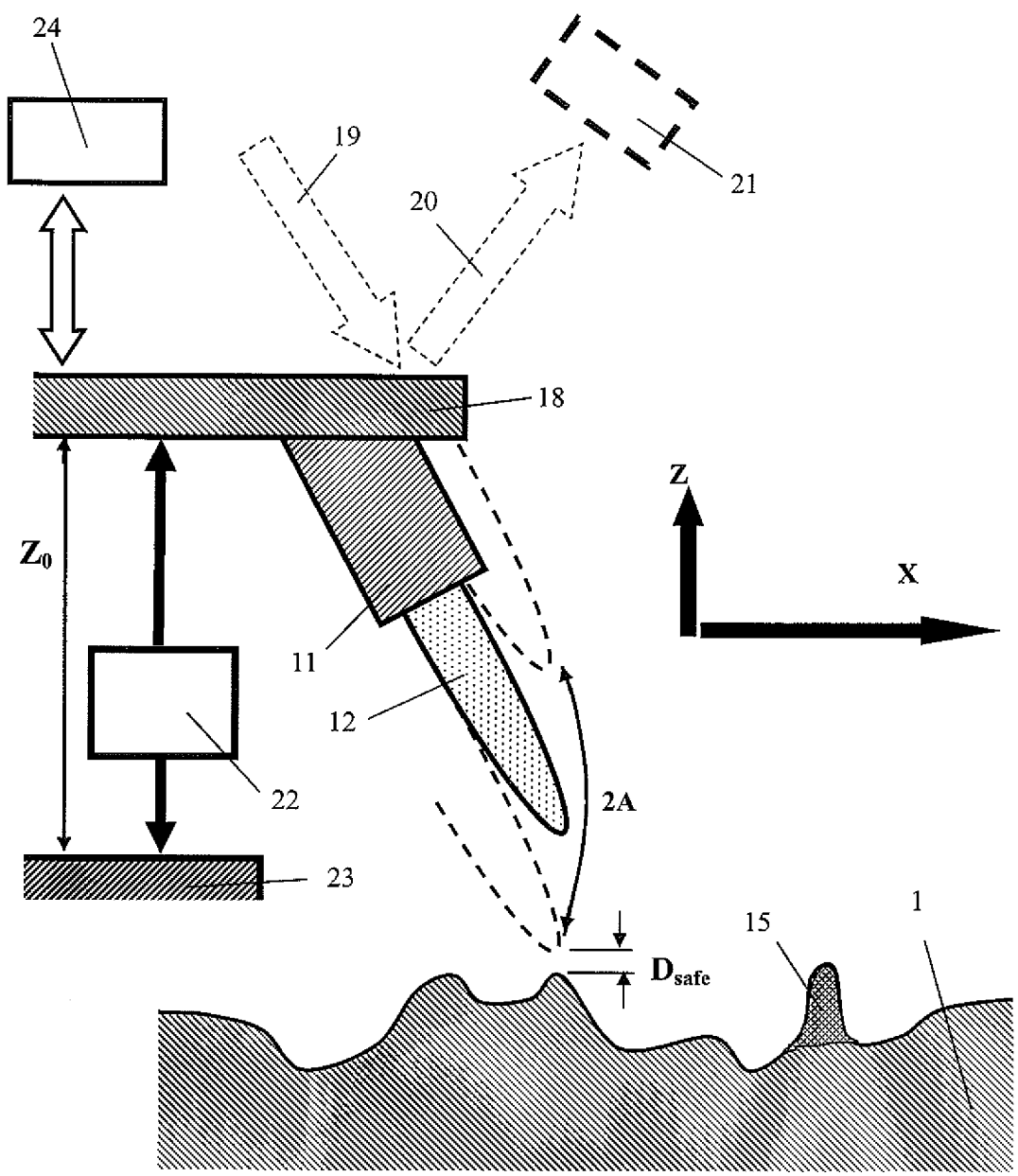
FIG. 11 depicts oscillation of the probe in the first safe regime of intermittent contact.

Step (b). Initiating a first regime of said SPM, for example so-called intermittent contact regime in which controllable relocation of the probe along sample's surface is safe, whereas damages of both the tip and the sample are fully prevented by keeping at least a predetermined minimum safe distance $D_{safe}$ between said sharp tip and a surface of the sample. Specific settings of SPM in the first regime may be different but in any case conditions of previous sentence must be satisfied. As an example only and for better understanding of intermittent contact regime, FIG. 11 depicts high frequency Z-oscillation of the probe 18 together with its needle 11 over the surface of the sample 1. The upper and lower positions of the needle and its tip 12 are shown in FIG. 11 with dashed lines. In the first regime the SPM keeps predetermined value of feedback signal. In this regime the feedback signal provided by either system 24 or system 21 may relate to either frequency (typically in between 50 KHz and 1 MHz), or its phase, or doubled amplitude of oscillations 2A as discussed before. Note that in the first regime different feedback signals may be set programmatically in different periods if necessary or desirable.

Step (c). Moving either the probe 18 or the sample 1 in X-Y plane, which is substantially parallel to sample's surface, in order to locate said sharp tip 12 of the probe 18 over next desirable point of the sample to be analyzed. Note that in some periods the step (c) may be skipped if there is a need to repeat surface analysis in the same surface point more than one time.

Step (d). Establishing $Z_0$-position of the probe relatively either the sample 1 or stable base 23 of SPM, said $Z_0$-position providing at least said minimum distance $D_{safe}$ between said sharp tip 12 and the surface of the sample in proximity of said desirable point. Specific numeric value of $Z_0$-position found in each chosen surface point of the sample is formed by sensor system 22 and sent to controlling computer 25. Note that due to unpredictable relief of the surface $Z_0$-positions may be different in different points of analysis.

Figure 12:
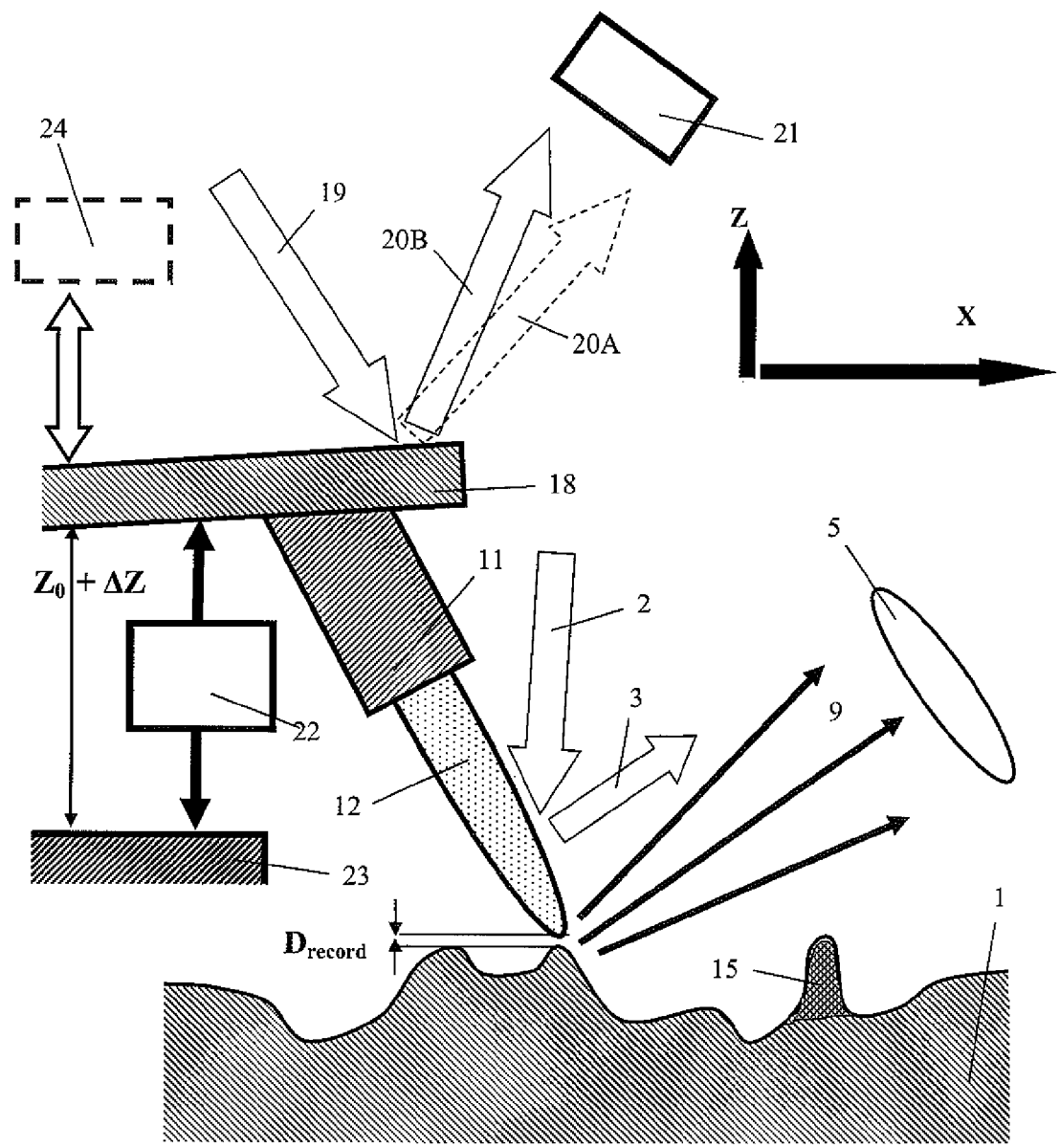
FIG. 12 depicts position of the probe relatively the sample in the second regime of TERS chemical analysis of chosen surface point.

Step (e). Switching SPM programmatically from said first regime to a second regime by changing at least one setting parameter of SPM operation. In some embodiments of present invention said change of at least one setting parameter may relate to change of either predetermined value of feedback signal or physical nature of feedback signal. Only as one of many possible examples of such change of physical nature, the initial feedback signal created by the system 24 and related to oscillation of the probe 18 (see FIG. 11) may be changed to quite different feedback signal created by opto-electronic system 21 and related to deformation of the probe 18 as depicted in FIG. 12 wherein said deformation causes light beam 20 to change direction from 20A to 20B. In other embodiments said change of setting parameter may relate to a system operating with signals of at least one sensor 22 associated with Z-position of the probe. This kind of embodiments (discussed later in the section called Example 2) requires memorizing $Z_0$-position established in step (d) in the memory of controlling computer 25.

Step (f). Changing Z-position of the probe 18 using SPM operation in said second regime so that the tip 12 of the probe gets a new Z-position=$Z_0$-position+$\Delta Z$, wherein $\Delta Z$ is separately determined parameter satisfying programmatically following predetermined conditions:

(i) the new Z-position is more appropriate for desirable type of chemical analysis than previously found $Z_0$-position, wherein desirable type of chemical analysis may be either a tip enhanced Raman scattering of the light emitted from proximity of said sharp tip 12, or tip enhanced laser-induced fluorescence in chosen point, or other type, and (ii) the new Z-position results in establishing new distance $D_{record}$ between the tip 12 and the surface of the sample 1, said new distance $D_{record}$ creates no damage to both the sharp tip 12 and the sample 1 when this new distance $D_{record}$ is kept for predetermined limited time interval of the contact $\tau_{cont}$ (determination of this interval $\tau_{cont}$ has been discussed before).

In some cases depending on both the nature of the sample, material of the tip 12, and desirable type of chemical analysis said new Z-position may correspond to decreased distance $D_{record} < D_{safe}$ between the tip 12 and sample's surface. In other, relatively rare cases, new Z-position may relate to increased distance $D_{record}$ safe between these two elements. Determination of optimum parameter $\Delta Z$ as far as technical details and elements involved in said changing Z-position of the probe may be different in different embodiments and will be discussed separately herein below.

Step (g). Illuminating said sharp tip 12 of said probe 18 with focused laser beam 2. Illumination may be initiated at any time point between preliminary step (a) and the next step (h). If the laser 4 produces non-interrupted continuous laser beam 2, the initiation of the illumination can be done only one time while the first period of the method with no repeating said initiation in other periods. The only important condition is that the tip 12 must be illuminated by laser beam 2 during next step (h).

Step (h). Collecting the light 9 emitted from proximity of said sharp tip 12, said collecting provided by optical system 5 and aimed to direct the emitted light onto an entrance of optical spectrometer 6.

Step (i). Initiating data recording, said data obtained from spectrometric analysis of said emitted light by said optical spectrometer 6, said recording continuing for a predetermined time interval $\tau_{record}$ which cannot exceed the predetermined limited time interval of the contact $\tau_{cont}$.

Step (j). Store data accumulated during step (i) in memory of controlling computer 25 so that said record is associated with stored X and Y coordinates of the probe 18 brought to the current point of analysis. The data obtained contain the information related to chemical compounds located in chosen point on the surface.

Step (k). Interrupting data recording, namely said data recording related to present point of surface chemical analysis, and terminating the second regime of SPM operation in the end of predetermined limited time interval of the contact $\tau_{cont}$.

Step (l). Terminating the method if the current point of chemical analysis is the last one. Otherwise returning to step (b) in which:

(i) SPM will be switched again to the first regime in order to relocate the probe 18 safely to the next desired point of the surface of the sample 1, and (ii) repeat the sequence of steps (c) to (l) for surface chemical analysis of the next desirable point.

This step (l) provides periodicity of the method of present invention and means returning to safe $Z_0$-position of the probe which reduces the chances of damage while traveling of the probe along main X-Y surface plane of the sample.

It can be appreciated by anyone of ordinary skill in the art that general scope of present invention remains the same in two possible technical cases: (i) the sample's position is fixed relatively stable base 23 of SPM, and scanning mechanism of SPM is capable of relocating the probe 18 relatively both said fixed sample 1 and said base 23, and (ii) the position of the probe 18 is fixed relatively stable base 23 of SPM, and scanning mechanism of SPM is capable of relocating the sample 1 relatively both said fixed probe 18 and said base 23. The method invented is equally applicable to both these cases because the only important point is that coordinates of the probe 18 can be changed relatively the sample 1.

It can be appreciated that general methods of present invention described above solves the problem of prior art methods. The new methods of this invention substantially decrease the chances of causing damage to either the probe or the sample. Particularly new methods eliminate the combination of prior art operations in which non-interrupted too tight direct contact (either electric or mechanical one) of the probe with the surface of solid sample occurs for too long time simultaneously with continuous movement of said probe along the surface.

EXAMPLES

The following examples illustrate some specific embodiments of the invention. These examples are not intended to limit the scope of the invention, and based on the general descriptions above and the specific descriptions in these examples, persons of ordinary skill can readily create additional embodiments. All of those embodiments are considered part of the invention.

The general methods disclosed in previous section is fully applicable to all embodiments of present invention. However, some specific details of different embodiments may be different as well.

There are two main versions of embodiments of the invention in which different technical approaches are used to provide steps (e) and (f) in order to switch regimes of SPM and cause desirable transition from relatively high $D_{safe}$ to relatively low (in most cases) $D_{record} < D_{safe}$. For simplicity and better understanding of said difference it would be easier to think that in both said versions initial $D_{safe}$ is to be established with the use of the same first regime of SPM operation described in the steps (b), (c), and (d) of general method, namely the regime of intermittent contact wherein the probe 18 oscillates with high frequency and predetermined by chosen setting feedback signal relates to at least one of few measurable parameters of this oscillation.

Electronic system 24 excites high frequency oscillation of the probe 18 and simultaneously the same system 24 may be used as the source of feedback signals in the case if the probe 18 is attached to piezoelectric resonator. Opto-electronic system 21 may be used as the source of feedback signals in the case if the probe 18 is attached to traditional cantilever, Given that one should only consider how different are these two versions in regard of steps (e) and (f).

Example 1

In this example, settings of SPM are switched programmatically in the step (e) so that the operation of SPM changes from the first regime to the second one. In any case that should result in setting of another predetermined feedback parameter which is different from that in the first regime. The result provided by the step (f) is that the probe 18 and its tip 12 move in Z-direction closer to the surface of the sample 1 until predetermined deformation of the probe 18 is reached. That is how the contact between the sample and the tip 12 is established in the step (f) in accordance with desirable lower distance $D_{record}$ shown in FIG. 12. It should be stressed that in the case of present example the device of the invention doesn't operate directly with numeric value of predetermined parameter ΔZ because actual change of Z-coordinate occurs accordingly to said change of predetermined feedback parameter.

During the second regime new distance $D_{record}$ is fixed because Z-operation of SPM is built so that Z-coordinate of the probe 18 is defined by stable feedback signal of second regime coming to controlling computer 25 from either system 21 or system 24. Thus, in the embodiments of this example, the feedback system remains active in the second regime, namely during all steps from (f) to (j) inclusively. At the same time, in second regime mentioned stability of $D_{record}$ provides stable tight contact which means that high frequency oscillation of the tip 12 is practically fully suppressed. That is why said oscillation should not be excited by the system 24 in the second regime.

Example 2

A difference in this example from that in Example 1 is that in this example, settings of SPM are switched programmatically in the step (e) so that feedback system controlling Z-position of the probe 18 becomes fully disconnected from scanning mechanism 26 and disabled temporarily while all steps from (e) to (j) inclusively. Peculiarity of this case is that numeric value of predetermined parameter ΔZ is used directly. Thus, Z-movement of the probe 18 during step (f) occurs according to readings of sensor system 22 only, so that predetermined value ΔZ is reached which results in transition of the probe 18 from initial safe $Z_0$-position to new Z-position and corresponding change of the distance from initial $D_{safe}$ to appropriate for recording distance $D_{record}$. In that regard it can be noted that in embodiments corresponding to this example 2 predetermined value ΔZ may be defined and optimized with the help of few separate preliminary measurements provided in ether one or more points of given particular sample before starting scanning of full sample area.

One more difference between the two examples is that at certain ΔZ values in example 2 allows keeping needle 11 oscillating with both high frequency and controllable amplitude if the system 24 is not disabled in the second regime.

It can be noted also that in both Examples 1 and 2, methods of the invention may include additional TERS measurements performed at any appropriate moment when the distance between the tip 12 and the sample 1 exceeds desirable contact distance $D_{record}$. Such additional measurements can be included into the set of general steps described above as additional steps in order to control chemical purity of the needle 11 and, if necessary, in order to increase precision of chemical analysis of the sample by subtraction of chemical contaminations located on the needle.

Example 3

In this example, one more additional step may be desirable, namely the step of chemical mapping of full area scanned by SPM in framework of the method of present invention. This step is based on transfer of chemical information obtained while scanning in each point of surface analysis with known and memorized plane coordinates X-Y. For example, different chemical information mentioned may be represented by different colors or by any other way convenient for visual representation. This step becomes possible if the number of points analyzed exceeds one, and more desirable this number represents plurality of points analyzed, said plurality exceeding one at least one order of magnitude. Additional step of chemical mapping may be extremely useful because it results in visualization of distribution of different chemical compounds over scanned area. This additional mapping step may be performed either point-by-point in the end of each period of the method after the step (l) or after complete termination of the method.

Advantages of the Invention

Advantages of the systems, devices, and methods of the present invention have been already described before in different sections of the present specification. substantial additional advantages are characteristic of this invention. Moreover, some details of advantages can be expressed numerically. These advantages include the following:

1. The methods disclosed above are practically non-destructive. This is demonstrated by high reproducibility of results of chemical analysis obtained in few (at least three) subsequent scanning of the same sample.

2. The methods disclosed above demonstrate very high spatial resolution in determining of different chemical compounds. This resolution may be as good as about 3 nm.

3. The method disclosed above demonstrates very high sensitivity which corresponds to detection and chemical characterization of single organic molecules located on the surface of a sample. If area of full scan is 200×200 nm the said sensitivity corresponds to detection of about 0.00025 monolayer.

It can be appreciated by anyone of ordinary skill in the art that the new systems, devices and methods of surface chemical analysis based on TERS phenomenon has been described in present specification as example only. Actually the same method may be easily modified for measurement of other optical characteristics of a surface layer, said characteristics related to chemical nature of compounds located on the surface. These other characteristics may be for example laser-induced luminescence, attenuated polarization, etc. In these cases the only change of the method is required that optical device of preliminary step (a) is to be adapted for recording said other physical parameters of secondary light emitted from proximity of sharp tip 12 of the needle 11.

INCORPORATION BY REFERENCE

Each and every document, reference, or citation herein is incorporated herein fully by reference, as if separately so incorporated.

We claim:

1. A non-destructive method of surface chemical analysis of a sample, the method comprising the following steps:
    (a) providing a device comprising a computer, a scanning probe microscope (SPM) operably linked with an optical spectrometer so that said device is capable of die following operations:
        (i) programmable switching while scanning of die sample's surface between at least two regimes of scanning probe microscope operation;
        (ii) relocating either the sample or a probe of said microscope for changing a position of said probe in any of three dimensions in each of said two regimes, said position of the probe defined relative to said sample;
        (iii) placing a tip of said probe at a first point on the surface of said sample and illuminating said sharp tip of said probe with a focused laser beam;
        (iv) collecting a light emitted from said surface proximate to said tip for spectrometric analysis provided by said optical spectrometer; and
        (v) storing in a memory of said computer both current coordinates of the probe and results of said spectrometric analysis obtained at said current coordinates;
    (b) initiating a first regime of said scanning probe microscope, said first regime including placing said tip located at the first point of the surface resulting in:
        (i) raising said tip off said surface normal to said surface fin the "Z dimension" or "Z axis'"), and
        (ii) keeping at least a predetermined minimum distance between said tip and said surface for preventing damage of either the tip or the sample;
    (c) moving either the probe or the sample to locate said tip of the probe over another point of the sample to be analyzed;
    (d) establishing a $Z_0$-position of the probe relative to the sample, said $Z_0$-position providing at least a minimum distance between said tip and the surface of the sample in proximity of said another point;
    (e) storing in said memory of said computer, the $Z_0$-position established in step (d);
    (f) initiating a second regime of said scanning probe microscope, said second regime comprising such change in the Z-position of the probe such that the probe gets a new Z-position=$Z_0$-position+$\Delta Z$, wherein $\Delta Z$ is a non-zero parameter satisfying the following programmatically predetermined conditions:
        (i) said new Z-position is suitable for a tip enhanced Raman scattering of the light emitted from proximity of said tip than $Z_0$-position, and
        (ii) said new Z-position results in no damage to both the tip and the sample;
    (g) illuminating said tip of said probe with said focused laser beam resulting in emission of light from the proximity of said sharp tip:
    (h) collecting the light emitted from tire proximity of said tip;
    (i) initiating data recording in said memory of said computer, said data obtained from spectrometric analysis of said light by said optical spectrometer, said recording continuing for a predetermined time interval;
    (j) storing in said computer memory both coordinates of the probe corresponding to said another point of analysis and data recording accumulated during step (i); and
    (k) returning to step (b) for providing surface chemical analysis in next at another point of the surface of the sample.

2. A non-destructive method of surface chemical analysis of a sample, the method comprising the following steps:
    (a) providing a device comprising a computer with a memory and a scanning probe microscope operably linked with an optical spectrometer so that said device is capable of the following operations:
        (i) programmable switching while scanning of the sample's surface between at least two regimes of scanning probe microscope operation;
        (ii) changing a position of a probe of said microscope relative to said sample in any of three dimensions in each of said two regimes;
        (iii) illuminating a tip of said probe with a focused laser beam;
        (iv) collecting a light emitted from said sample in proximity to said tip for spectrometric analysis provided by said optical spectrometer; and
        (v) storing in said computer memory both current coordinates of the probe and results of said spectrometric analysis related to said current coordinates;
    (b) initiating a safe regime of scanning probe microscope operation, said safe regime avoiding any damage during movement of the probe relative to the sample;
    (c) moving either the probe or the sample in a direction substantially parallel to sample's surface to locate said tip of the probe safely over a surface point of the sample to be analyzed;
    (d) switching said scanning probe microscope into another regime of operation, said another regime providing contact of said sharp tip with said surface point of the sample;
    (e) making chemical analysis of said surface point during a limited time interval rcont, said chemical analysis comprising:
        (i) illuminating said tip with a focused laser beam,
        (ii) providing spectrometric analysis of said light emitted from the sample in proximity to said tip,
        (iii) storing results of said spectrometric analysis in the computer memory;
    (f) terminating said contact at the end of said limited time interval $\tau_{cont}$ by switching back to said safe regime of scanning probe microscope operation, said switching back resulting in increasing the distance between the probe and the sample; and (g) returning to step (c) for relocating the probe to another point of the analysis or terminate the method if the point analyzed in the step (e) is the last one.

3. The method of claim 2, wherein during the step (e) said time interval $\tau_{cont}$ doesn't exceed 0.2 s by an order of magnitude, or $\tau_{cont}$ is less than or equal to 0.05 s, or $\tau_{cont}$ is between 0.01 s and 0.001 s.

4. A non-destructive method of surface chemical analysis of a sample, the method comprising steps:
   (a) providing a scanning probe microscope (SPM) operably linked to an optical spectrometer and a computer with a memory, said computer programmed with instructions to:
   (i) change position of a probe of said SPM relative to said sample in any of three dimensions, said change performed by relocation of either the probe or the sample relatively each other;
   (ii) place a tip of said probe at a first point on a surface of said sample;
   (iii) illuminate said tip of said probe with a focused laser beam;
   (iv) store in the computer memory, results of chemical analysis of a substance located on the surface of said sample in proximity to said tip, said analysis using said optical spectrometry of a light emitted from the surface of the sample proximate to said tip;
   (b) initiating a first regime, comprising:
   (i) placing a tip of said probe at a first point on a surface of said sample:
   (ii) illuminating said tip of said probe with a focused laser beam:
   (iii) storing in said computer memory, results of chemical analysis of a substance located on the surface of said sample in proximity to said tip, said analysis using said optical spectrometry of a light emitted from the proximity of said tip;
   (iv) increasing a distance between said tip and said surface and repositioning the probe over a second point on said sample, said repositioning comprising shifting of said probe parallel to the sample's surface which takes net no longer than a predetermined time interval $\tau_1$;
   (c) initiating another regime of scanning microscope operation, said another regime resulting in lowering said distance between the tip of said probe and said surface of the sample in order to bring said tip into contact with another next point of the sample located in previous step (b), wherein said next another point is either a second point or any other point of the sample;
   (d) keeping both said contact and said illumination of said tip during a limited time interval $\tau_2$ for simultaneous acquisition of chemical data obtained by said optical spectrometry of the light emitted from the surface in proximity to said next another point;
   (e) terminating said contact between tip of the probe and the surface of the sample at the end of said limited time interval $\tau_2$ by terminating said another regime of scanning microscope operation; and
   (f) returning to the step (b) to either select another point on said surface, then repeating steps (c) and (d).

5. The method of claim 4, wherein during the step (d) said time interval $\tau_2$ doesn't exceed 0.2 s by an order of magnitude, or $\tau_2$ is less than or equal to 0.05 s, or $\tau_2$ is between 0.01 s and 0.001 s.

6. The method of claim 4, wherein during step (d), a shifting of said probe parallel to the surface of said sample is performed with a predetermined speed $S_2$ which doesn't exceed speed $S_1$ of similar shifting during the step (b) and $S_2$ is established so that the product of multiplication $\tau_2 S_2$ doesn't exceed 3 nm, or $\tau_2 S_2$ doesn't exceed 1 nm.

7. The method of claim 6, wherein during step (d), said speed $S_2$ is equal to zero for obtaining spatial resolution of chemical analysis and/or for avoiding damage to either said sample and/or said tip of the probe.

8. The method of claim 6, wherein either step (e) or step (f) comprises a sub-step of returning said speed of shifting of said probe parallel to the surface of said sample from the value $S_2$ in the step (d) to a previous value $S_1$ which is not less than said $S_2$ or exceeds $S_2$.

9. The method of claim 4, wherein said illuminating of the tip is initiated in an additional sub-step performed only once at any moment before first beginning step (d), said illuminating continuing with no interruption until terminating the method accordingly to condition of the step (f).

10. The method of claim 4, wherein step (c) comprises an additional sub-step performed at the beginning of time interval $\tau_2$, said sub-step comprising illuminating the tip with said focused laser beam.

* * * * *